Aug. 31, 1948.                C. B. NASH                2,448,043
           FUEL FEEDING APPARATUS FOR INTERNAL-COMBUSTION ENGINES
Filed May 23, 1944                                5 Sheets-Sheet 1

Aug. 31, 1948.                    C. B. NASH                    2,448,043
              FUEL FEEDING APPARATUS FOR INTERNAL-COMBUSTION ENGINES
Filed May 23, 1944                                     5 Sheets-Sheet 4

Inventor
Carl B. Nash

By
Strauch + Hoffman
Attorneys

Patented Aug. 31, 1948

2,448,043

UNITED STATES PATENT OFFICE 2,448,043

FUEL FEEDING APPARATUS FOR INTERNAL-COMBUSTION ENGINES

Carl B. Nash, Detroit, Mich., assignor to Divco Corporation, Detroit, Mich., a corporation of Michigan Application May 23, 1944, Serial No. 536,992

14 Claims. (Cl. 123—127)

This invention relates to fuel feeding for internal combustion engines and is particularly concerned with fuel feeding apparatus and methods for increasing the operating efficiency of internal combustion engines especially at idling and low engine speeds, or at any speed at less than maximum power operation.

It is known that the ordinary gasoline engine used in automobiles operates most efficiently when the operator controlled throttle valve between the carburetor and the intake manifold is wide open and does not materially restrict passage of the fuel mixture to the cylinders. The usual gasoline engine operating at fully open throttle is approximately twice as efficient in terms of gasoline economy as the same engine operating with the throttle valve only about one quarter open. These characteristics have long been accepted.

Such differences in efficiency of gasoline consumption at various throttle openings may be explained by considering that in the usual gasoline engine, as the throttle approaches closed position, it provides a passage restriction in the path of the fuel mixture. The intake manifold passage which has a cross-sectional area corresponding to fully open throttle then serves effectively as an expansion chamber wherein the velocity of the fuel mixture through the intake manifold is rapidly reduced. At low and idling engine speeds, this reduction in velocity of the fuel mixture results in a very substantial loss of power since at low velocities the fuel droplets suspended in the mixture tend to separate out so that the fuel mixture eventually introduced into the cylinder is non-uniform and unbalanced and burns poorly.

Attempts have been made to solve this problem by using a smaller than normal intake manifold passage or by placing a permanent choke device in the usual standard intake manifold to reduce its cross-sectional area so that at low engine speeds a reasonably high velocity of fuel mixture is maintained. The main difficulty with such arrangements is that restriction of the intake manifold passage gives the required high fuel mixture velocity at low engine speeds at the expense of excessive fuel mixture velocities and undesirable sacrifice in power when the throttle is opened for higher power demands. Hence most practical attempts to so solve the problem represent compromise constructions wherein either economy at low engine speeds or power are sacrificed according to the exigencies of the situation. The effect of too high fuel mixture velocities is that the cylinders will not be efficiently filled with fuel, and this results in a corresponding loss in power especially at high engine speed and high power demand conditions.

Fuel feed arrangements are also known employing multiple stage carburetion wherein two associated intake manifold passages are connected to respective carburetors which become operative to supply fuel mixtures at different engine speeds. Such arrangements if properly designed may represent improvements over the above described usual fuel feeding methods and reduced intake manifold devices, but to my knowledge none of them has proved commercially practical or satisfactory.

The ultimate condition of fuel feeding operation, which is therefore desirable in gasoline engine operation and which is more closely obtained by the present invention than by any of the fuel feeding and regulating devices known to have been used prior to the present invention, is to maintain a substantially uniform velocity of the fuel mixture in the manifold high enough to maintain the fuel in suspension in the air with the provision of only minimum restriction of the manifold as assurance that maximum power is available during the range of engine operating speeds. In theory it would be most efficient to vary the intake manifold passage area with each change in engine speed but this is not practical. I have provided a novel manifold construction and fuel feeding arrangement by which this desired condition is closely approached in actual practice, and the present invention satisfies a long felt need in the art, especially in the delivery vehicle field where vehicles are operating at idling and low speed during the major portion of their use and economy and efficiency are governing factors in the choice of power means for such vehicles.

According to the present invention the intake manifold is divided into upper and lower sections each of which receives a fuel mixture from a separate carburetor, or from separate outlets of a dual carburetor device. Each section in turn is separated into a plurality of passages corresponding in number to the number of cylinders. Each passage of each section is made as closely as possible of identical shape and size and of uniform cross-section throughout, and preferably all passages are of the same shape and size. Thus in a four cylinder engine, each carburetor delivers its fuel mixture to a separate intake manifold section consisting of four similar passages.

The passages are so arranged that each inlet valve port is open to a pair of passages, one from each section of the intake manifold. Furthermore, suitable projections from the intake manifold, or built-in dividing walls in the inlet ports, provide individual uniform continuations of each passage into the engine block at each inlet port and as far as possible up to the valves which admit the fuel mixtures to the engine cylinders.

I have also provided for staged operation of the two carburetors, so that one supplies its fuel mixture to the intake manifold at least at low engine speeds while the other is connected to deliver its fuel mixture to the intake manifold only upon predetermined actuation of the throttle controls by the operator, usually at higher engine speeds and power demands.

By the above arrangement, during low and idling engine speeds, a fuel mixture passes at high velocity through one section of the intake manifold. The total transverse passage area in this one manifold is the same as the full throttle passage area of the associated carburetor, being similar to the permanently choked manifold above mentioned, so that expansion of the mixture is inhibited and the required high fuel mixture velocity is maintained.

When more power or higher engine speeds are desired, the second carburetor automatically becomes connected to its intake manifold section which is similar to the first manifold section and the combined fuel mixture delivery of both manifold sections is sufficient to meet the power demands. Always the fuel mixture from each carburetor passes through the intake manifold and engine inlet ports along passages substantially of uniform cross-sectional area from one end to the other and so designed as to reduce to a minimum turbulence or other mixture velocity reducing conditions. Each inlet valve is fed by two separate passages.

The invention also includes useful details of apparatus for accomplishing the above as will appear in the following description of its preferred embodiment.

It is therefore a major object of the present invention to provide a novel system and method of operating a gasoline engine wherein high fuel mixture velocities are maintained at low engine speeds thereby resulting in gains in economy and power, and wherein there is no sacrifice in power at high speed and other open throttle conditions of operation.

A further object of the invention is to provide a novel intake manifold arrangement for an internal combustion engine wherein at low engine speeds the manifold is choked to provide relatively high fuel mixture velocities for such engine speeds, and at higher engine speeds the manifold passage area is sufficiently large to keep fuel mixture speed down to an efficient level and supply ample fuel for power demands.

It is another object of the invention to provide a method and apparatus for feeding a fuel mixture to an internal combustion engine wherein the fuel mixture is supplied to the respective intake valves of said engine through individual intake manifold passages which are preferably of substantially uniform cross-sectional area along their lengths.

A further object of the invention is to provide a novel multi-passage intake manifold construction for supplying a fuel mixture to an internal combustion engine.

It is a still further object of the invention to provide a novel intake manifold and carburetor assembly for an internal combustion engine whereby fuel mixtures from separate carburetor sources are selectively conveyed to the engine cylinders during predetermined conditions of operation for maintaining engine operation at maximum efficiency during the entire speed and power range.

A further object of the invention is to provide a novel fuel feeding assembly for an internal combustion engine wherein a plurality of carburetors are connected at different levels to a special intake manifold for insuring sufficient delivery of fuel to operate the engine efficiently during all conditions of operation, and wherein means is provided for conducting gasoline normally leaking out of the upper carburetor into the lower carburetor for consumption therein.

A further object of the invention is to provide a fuel feeding assembly for an internal combustion engine involving dual carburetion wherein novel throttle control mechanism is provided for obtaining staged operation of separate carburetors.

It is a further object of the invention to provide a novel fuel feeding arrangement and method for an internal combustion engine wherein fuel mixtures are conveyed from a plurality of separate carburetors to the intake valves of said engine through intake manifold sections individual to each carburetor, the sections each consisting of passages of substantially uniform cross-sectional area each leading to a separate intake valve.

A further object of the invention is to provide a novel multi-passage intake manifold for an internal combustion engine wherein novel arrangements are provided for using the exhaust gas heat for preheating the fuel mixture introduced into all the intake manifold passages.

Further objects of the invention will presently appear as the description proceeds in connection with the appended claims and the annexed drawings wherein:

Figure 1:
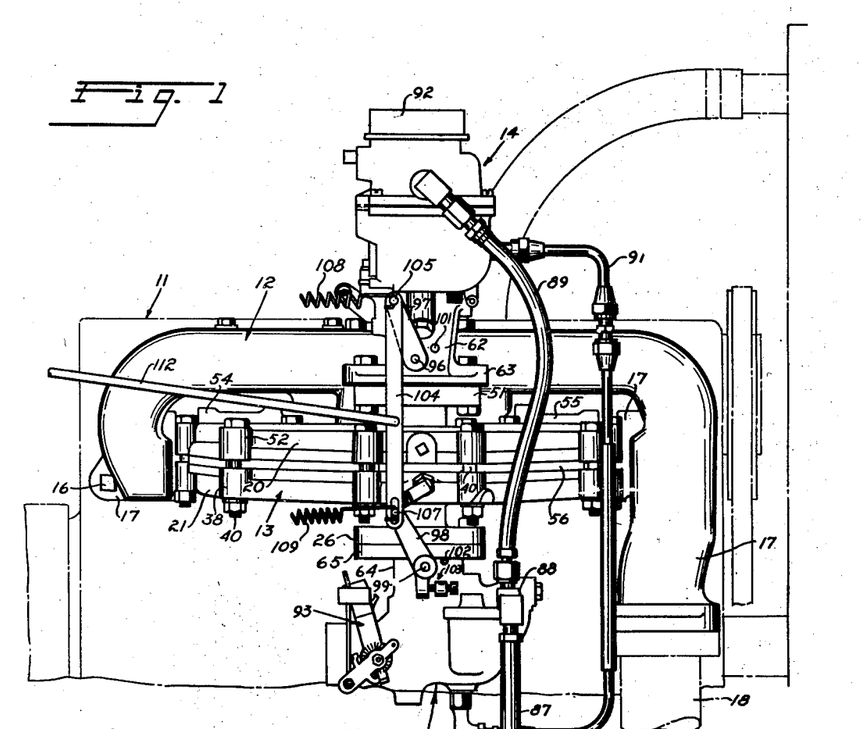
Figure 1 is a side elevation of my novel intake manifold and carburetor assemblies secured in operative position upon a gasoline engine.

Referring now to Figure 1, an internal combustion engine such as a gasoline engine designated at 11 has secured thereto in operative alignment with the intake and exhaust valve ports an intake and exhaust manifold assembly comprising an exhaust manifold 12, an intake manifold 13 and upper and lower carburetors 14 and 15, respectively, which are connected to deliver fuel mixtures to the intake manifold as will be hereinafter described.

Exhaust manifold 12 (see Figures 1 and 5) is rigidly secured to the engine block as by bolts 16 passing through flanges 17 integrally formed at its opposite ends and intake manifold 13 is also secured to the engine block by suitable means (not shown). Exhaust manifold 12 is formed with the usual internal passages which are connected with suitable ports leading to the exhaust valves of engine 11 so that the hot exhaust gases from the engine may be conducted away from the cylinders through manifold 12 and downwardly extending pipe 17 to the muffler connection 18. Details of construction of exhaust manifold 12 and its coupling with the exhaust ports are mainly conventional and will not be herein described except for the manner of conducting heat to the fuel mixture.

*The intake manifold assembly*

Figure 5:
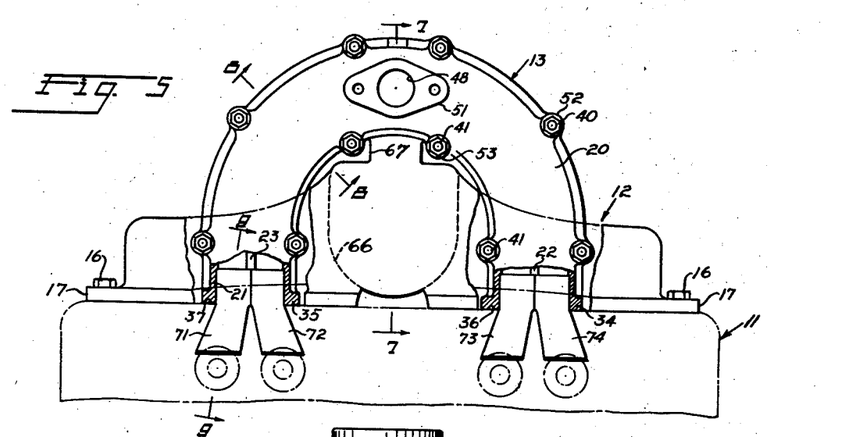
Figure 5 is a top plan view, partly in section and partly broken away, illustrating the manner in which the exhaust and intake manifolds are mounted on the engine block and illustrating details of the passage forming projections protruding from the ends of the intake manifold into the engine block adjacent the intake valves.
Figure 6:
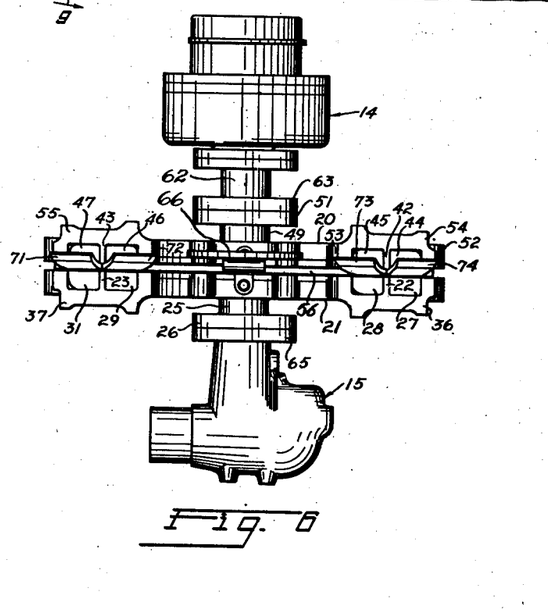
Figure 6 is an elevation illustrating the intake manifold assembly separated from the engine and with the exhaust manifold removed therefrom.

Intake manifold 13 is associated with engine block 11 as shown in Figure 5, and comprises a pair of substantially identical upper and lower arcuate annular metal housing castings 20 and 21 separated by a central spacer plate later described.

Figure 11:
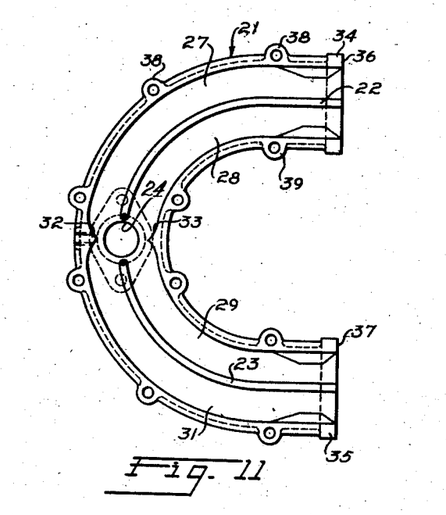
Figure 11 is an interior plan view of the casting comprising one half of the intake manifold housing illustrating the central rib structure and other details of construction.
Figure 12:
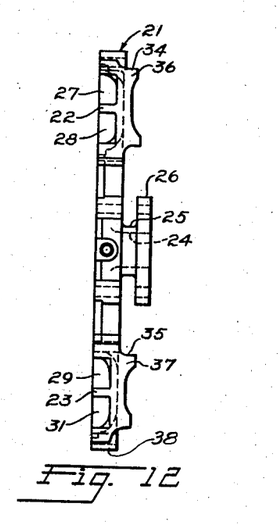
Figure 12 is an end elevation of the intake manifold casting of Figure 11 illustrating further the passages within the manifold.

Lower casting 21, Figures 11 and 12, is formed with integral internal central ribs 22 and 23 extending from the opposite open ends of casting 21 to the opposite edges of a circular aperture comprising the upper end of a cylindrical bore 24 opening downwardly through an external boss 25 and a carburetor attachment flange 26.

Ribs 22 and 23 divide the interior of casting 21 into four longitudinal passages 27, 28, 29 and 31 leading from bore 24 to the ends of casting 21. These passages are substantially of the same size. Adjacent bore 24, the side walls of casting 21 are formed with internal projections 32 and 33 which cooperate with the adjacent ends of ribs 22 and 23 and are of such suitable arcuate formation that the initial throats of the four passages in casting 21 are of substantially the same size as the remainders, thus providing four passages of substantially uniform cross-sectional area throughout their lengths between bore 24 and the ends of casting 21. Casting 21 is formed at opposite ends with flanges 34 and 35 which have end faces 36 and 37, respectively, machined flat to lie in the same plane abutting against correspondingly machined vertical faces surrounding the intake valve ports on the engine block substantially as shown in Figure 5.

Casting 21 is also formed with a plurality of spaced hollow bosses 38 along its outer periphery and 39 along its inner periphery for accommodating through bolts 40 and 41 respectively as will appear.

Upper casting 20 is preferably of exactly the same construction as lower casting 21, being formed with central ribs 42 and 43 providing four longitudinal passages 44, 45, 46 and 47 between the ends of casting 20 and the circular mouth of a cylindrical bore 48 opening upwardly through boss 49 and carburetor attachment flange 51. Casting 20 is also formed with outer and inner through bolt bosses 52 and 53, aligned with corresponding bosses 38 and 39 of casting 21, and end flanges 54 and 55 having flat faces coplanar with faces 36 and 37 of casting 21.

Each casting 20 and 21 is machined on the side opposite its carburetor attachment flange to provide flat surfaces lying in planes for engaging the opposite flat sides of a spacer plate 56 which is clamped between the castings in the assembly. If desired suitable pressuretight gaskets may be provided between plate 56 and the castings.

Figure 13:
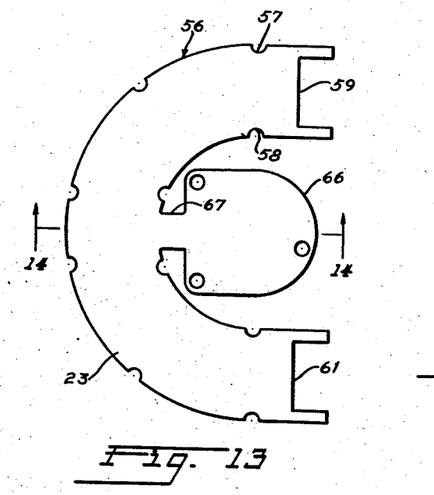
Figure 13 is a top plan view of the spacer plate which is clamped between the upper and lower castings of the intake manifold, illustrating also the integral plate which is used for heat transfer from the exhaust manifold.
Figure 14:
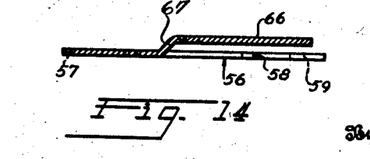
Figure 14 is a section along lines 14—14 of Figure 13 illustrating the offset position of the tab for attaching the intake manifold to the exhaust manifold.

Plate 56 is illustrated best in Figures 13 and 14 and has substantially the same arcuate configuration as the manifold housing castings, being formed with outer and inner notches 57 and 58 for permitting free passage of bolts 40 and 41. At its opposite ends, plate 56 is formed with substantially rectangular recesses 59 and 61 for a purpose which will be explained.

When clamped between castings 20 and 21 in the assembly, spacer plate 56 closes the open sides of the longitudinal passages in the castings, and divides the intake manifold into two sections each having four longitudinal passages connected to an intake bore, 24 or 48.

Upper carburetor 14 is provided with a downwardly extending outlet conduit 62 formed with a flange 63 for attachment to manifold flange 51. Similarly lower carburetor 15 is formed with an upwardly extending conduit 64 formed with a flange 65 for attachment to manifold flange 26. In this manner both carburetors are supported upon intake manifold 13.

Figure 7:
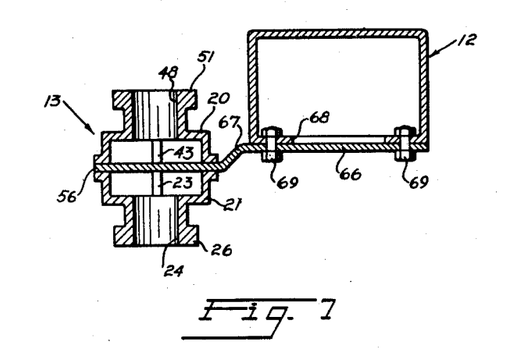
Figure 7 is a fragmentary sectional view substantially along the lines indicated at 7—7 in Figure 5 illustrating the manner in which the intake manifold is connected to the exhaust manifold for the transfer of heat.
Figure 8:
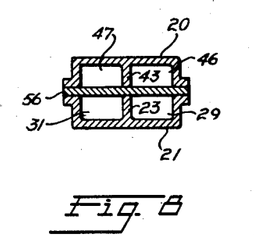
Figure 8 is a section along line 8—8 of Figure 5 illustrating the passage arrangements in the intake manifold.

As illustrated in Figures 7 and 14, spacer plate 56 is formed to provide means for transferring heat from the exhaust manifold to the portion of plate 56 directly opposite intake bores 24 and 48, to provide a heated surface located to assist in breaking up large drops of fuel which instead of turning into one of the various longitudinal passages 27, 28, 29, 31 continue in a straight line and impact plate 56. Preferably this heat transfer is accomplished by providing an integral external plate 66 which is connected by a restricted neck 67 to plate 56. Neck 67 is bent upwardly to locate plate 66 in a plane above the level of the spacer plate and of a convenient shape which may be utilized to fit with the associated exhaust manifold construction.

In the illustrated construction, plate 66 is suitably shaped to form the bottom wall of an aperture 68 in the bottom of exhaust manifold 12 and is secured to close that aperture by bolts 69, but the shape of plate 66 is not material to the invention.

Heat from plate 66 is transferred through neck 67 to plate 56 for establishing a hot region on spacer plate 56 directly opposite bores 24 and 48 and in the paths of the incoming fuel mixtures from the respective carburetors, plate 66 being heated by the outgoing exhaust gases. The cross-sectional area of neck 67 is chosen to provide a desired degree of heat transfer, and heat transfer may be controlled by variation of the cross-sectional area of neck 67.

Plate 66 need not provide a closure for the exhaust manifold but may comprise any suitable heat transfer member connected between the manifolds. In such structure there would be no aperture 68 and plate 66 or the equivalent would be secured to any suitable part of exhaust manifold 12.

Intake manifold assembly 13, so far as it has been described, provides individual uniform area intake passages up to its ends adjacent the intake ports in the engine block. Further means are provided for insuring that this uniform area passage arrangement is extended on through the inlet valve ports right up substantially to the valve seat apertures. In the illustrated embodiment, this arrangement consists in providing a plurality of insert members 71, 72, 73 and 74 suitably seated in recesses 59 and 61 in the opposite ends of manifold assembly 13 and adapted to project into the adjacent valve inlet ports.

Figure 15:
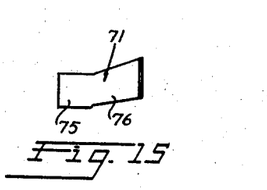
Figure 15 is a top plan view of one of the tongue inserts which is seated in each passage at the ends of the intake manifold assembly and which projects into the adjacent valve intake port.
Figure 16:
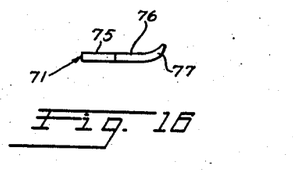
Figure 16 is a side elevation of the tongue insert of Figure 15 illustrating the upturned end thereof which is shaped to conform to the intake port contour so as to maintain uniform passage area right up to the valve.

Referring to Figures 15 and 16, member 71 comprises a flat rectangular base 75 adapted to fit within one half of recess 61 and a forwardly and angularly extending tongue 76 which has its front end curved upwardly at 77 to follow the contour of the inlet valve port. Each insert member is similarly constructed except that the tongues of each pair are arranged in diverging relation as seen in Figure 5, and is of the same thickness in base 75 as plate 56.

Figure 9:
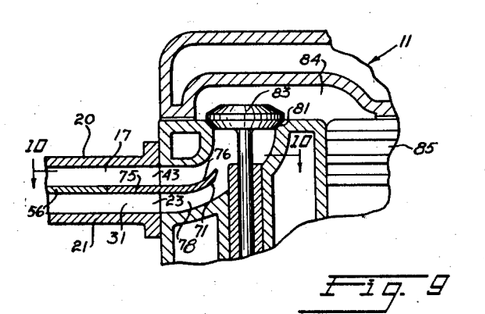
Figure 9 is a fragmentary vertical section substantially along 9—9 of Figure 5 illustrating further the passage arrangement by which the interior of the intake manifold is divided into passages of substantially uniform size right up to the intake valves.
Figure 10:
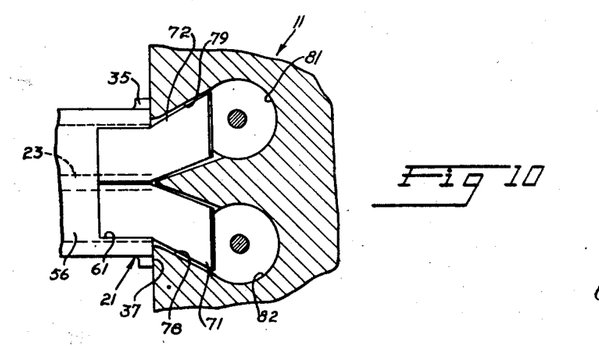
Figure 10 is a fragmentary plan view in section illustrating the passages of Figure 9 with the top half of the intake manifold removed to uncover the projection seating arrangement.

As illustrated in Figures 9 and 10, two oppositely diverging insert members 71 and 72 are fitted into recess 61 with their rectangular bases filling the recess. The insert members are preferably so located before bolts 40, 41 are tightened and are then held in place by being clamped between ribs 23 and 43 and corresponding side walls of castings 20 and 21. The tongues of members 71 and 72 project through valve inlet ports 78 and 79 (Figure 10) respectively almost to valve seat apertures 81 and 82. A valve 83 controls aperture 81, and passage 84 leads to the corresponding cylinder containing a piston 85. This arrangement is the same at each inlet valve.

The base portions 75 of insert members 71—74 are designed to fill recesses 59 and 61 and thereby complete the individual intake manifold passages right up to the engine block. From there on the tongue 76 of each insert member projects into its associated intake valve port and is shaped to divide that port into upper and lower passages providing substantial continuations of the intake manifold passages aligned therewith. The same arrangement is provided at the other end of intake manifold 13.

As can be appreciated, the sizes and shapes of tongues 76 are selected to suit the contours of the intake ports, and the illustrated construction serves only to demonstrate the shape such tongues would have as applied to a particular engine.

The tongues protruding from ends of manifold 13 may not fit very tightly into the inlet ports as clearance must be provided for their insertion but they are sufficient to serve as dividing walls and provide the required effective extensions of the manifold passages.

Figure 9A:
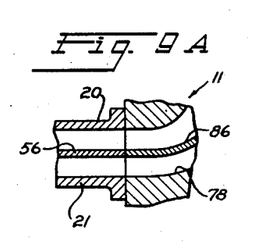
Figure 9A is a view similar to Figure 9 illustrating a manifold made in accordance with the present invention and applied to an engine which has integral division plates provided in the inlet ports.

A more efficient permanent construction may be provided, if desired, by embodying an integral dividing wall in each valve inlet port as illustrated in Figure 9A. Such a dividing wall 86 is located in a position corresponding to the illustrated positions of tongue 76 of Figure 9 and terminates flush with the engine block wall. In such an arrangement, spacer plate 56 has no end recesses but is completely coextensive with the castings and abuts at its ends against dividing walls 86. This arrangement is preferable for permanent construction, and the tongued arrangement of Figures 5 and 9 is especially suitable for conversion jobs.

Some large engines use two inlet valves at each inlet port. In such engines I arrange the dividing wall so that each section of manifold 13 is connected to a separate inlet valve.

Carburetor arrangements

Referring now to Figures 1–4, liquid fuel is fed to the engine through a main fuel pipe 87 which is connected to the bowl of lower carburetor 15 at 88, and to the bowl of upper carburetor 14, by conduit 89. I have found that where upper and lower level carburetors are mounted on a common manifold, such as the present construction, the float operated needle valves in the upper carburetor do not close completely because of vibration and jiggling during operation of the vehicle. This results in flooding and leakage of gasoline from the upper carburetor down through manifold 13 and lower carburetor 14, and out through the air intake of the lower carburetor. To correct this in the present assembly, conduit 91 extends from the float level of upper carburetor 14 down to the bottom of carburetor 15 so that excess gasoline in the float chamber of upper carburetor 14 is drained off and consumed in the lower carburetor.

As shown in Figure 1, upper carburetor 14 is provided with a clamp connection 92 for attachment of the usual air cleaner. Lower carburetor 15 is provided with a suitable choke valve assembly in the air intake passage as indicated at 93. For reasons which will appear during description of the operation of the invention, no choke assembly is necessary or provided for upper carburetor 14.

Figure 2:
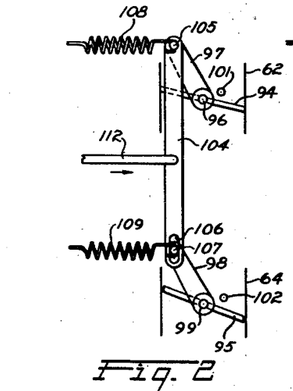
Figures 2, 3 and 4 are relatively diagrammtic elevational representations of the different positions of the throttles and actuating mechanism as the carburetors are successively connected to supply fuel to the intake manifold.
Figure 3:
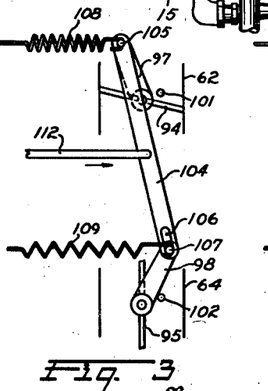
Figure 4:
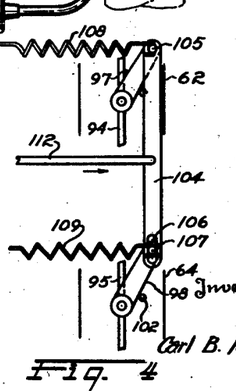

As illustrated in Figures 2-4, the respective upper and lower carburetor conduits 62 and 64 have mounted therein pivoted butterfly valves 94 and 95 which function as throttle valves between the respective carburetors and the associated sections of intake manifold 13. Throttle valve 94 has secured rigidly to its pivot 96 a crank arm 97, and a similar crank arm 98 is secured to pivot 99 of throttle 95. Stops 101 and 102 are provided to limit clockwise rotation of crank arms 97 and 98, and an idle adjustment screw 103 provides a stop limiting counter clockwise rotation of crank arm 98. No idle stop or adjustment is provided on carburetor 14.

An elongated bar 104 has its upper end pivotally connected at 105 to the free end of crank 97 and its lower end is pivotally and slidably connected by a lost motion connection comprising slot 106 and pin 107 to the free end of crank arm 98. Bar 104 is a free floating connection between crank arms 97 and 98.

A spring 108 is connected to pivot 105 and has its other end anchored to the engine block in a manner not shown. A second spring 109 materially weaker than spring 108 has one end connected to pivot 107 and has its other end suitably anchored on the engine block in a manner not shown. Springs 108 and 109 urge rotation of throttles 94 and 95 toward the positions they assume during idling as illustrated in Figure 2.

Intermediate its ends, bar 104 has pivotally connected thereto a rod 112 which extends rearwardly beyond the engine to suitable connection with an accelerator pedal or some other manual control available to the driver of the vehicle.

Springs 108, 109 and the lost motion connections at 106, 107 cooperate in providing sequential actuation of throttle valves 94 and 95 in response to movement of throttle actuating rod 112 in the direction of the arrows in Figures 2-4.

Thus, when the operator pushes down on the accelerator pedal, rod 112 is displaced to the right (Figures 1-4) since this tends to displace freely hanging bar 104 to the right. However, since spring 108 is much stronger than spring 109, the upper part of bar 104 is initially held stationary and lever 104 rotates counterclockwise about substantially stationary pivot 105. This counterclockwise rotation of bar 104 about pivot 105 is weakly opposed by spring 109 and causes clockwise rotation of crank arm 98 to open throttle valve 95 from the idle position of Figure 2.

Further movement of rod 112 to the right results in continued opening of throttle valve 95 until it reaches the fully open position shown in Figure 3, throttle 97 remaining closed all the while as permitted by the lost motion connection. Figure 3 illustrates the relative positions of the throttle valves at fairly low engine speeds.

Upon further actuation of rod 112 to the right demanding higher engine speeds, crank arm 98 is prevented by stop 102 from passing beyond fully open position of throttle valve 95, and now bar 104 pivots clockwise about pin 107 to rock crank arm 97 clockwise against the tension of spring 108 and open throttle valve 94. When valve 94 reaches fully open position, stop 101 prevents further clockwise movement of crank arm 97 and both throttle valves are now wide open since the force exerted on bar 104 holds valve 95 open.

Springs 108 and 109 are so proportioned in strength as to produce the above operation, spring 108 being strong enough to hold valve 94 closed until valve 95 is wide open. When the force on rod 112 is released springs 108 and 109 reverse the above, first closing valve 94 and then closing valve 95.

Since opening of both throttle valves is a function of the amount of movement of rod 112 to the right, a quick tramp on the accelerator pedal demanding full power will snap both throttle valves open without delay.

If desired valve 94 may be automatically sequentially opened at a predetermined engine vacuum by a suitable diaphragm connected to the intake manifold, instead of the lost motion connection of Figures 1-4.

*Operation and performance*

With the exhaust and intake manifold assemblies bolted together and to the engine block as above described, upper carburetor 14 is connected through conduit 62 and bore 48 to the four independent upper section intake manifold passages 44—47. Similarly lower carburetor 15 is connected through conduit 64 and bore 24 to the four independent lower section intake manifold passages 27—31. Each intake manifold passage is of uniform cross-sectional area right up to its associated valve seat, and preferably all of the passages are of the same size as above pointed out.

Assume that the engine is started and idling. The throttle valves of the respective carburetors are then arranged as illustrated in Figure 2, throttle valve 95 being slightly cracked to pass only enough fuel to maintain idling of the engine and throttle valve 94 being fully closed. This is the reason that carburetor 14 need not have idling jets or idling adjustments. During idling, therefore, a fuel mixture is introduced into the lower intake manifold passages only. The total cross-sectional area of those lower passages is about one-half of the total intake manifold passage area available when both throttle valves 94 and 95 are open and therefore the lower section of manifold 13 functions as a choked manifold at idling engine speeds. Thus the velocity of the incoming fuel mixture through passages 27—31 is maintained sufficiently high to keep the fuel mixture as a uniform suspension and an efficient fuel mixture is delivered to the engine cylinders during idling. The individual uniform passage to each cylinder insures minimum opposition to fluid flow along the passages.

The above condition progresses as the operator demands increased engine speed by manipulation of rod 112 to open throttle valve 95, and at some intermediate predetermined speed, throttle valve 95 becomes fully open, while spring 108 still maintains throttle 94 closed. Up to this point conditions of fuel feed remain much the same as at idling, the fuel mixture velocity being increased as throttle 95 is opened wider, and the amount of fuel available at various openings of throttle 95 is sufficient for the power demand. The total passage area of the lower manifold section is so selected that the fuel mixture velocities do not become excessively high at these low engine speeds.

Assume now that the operator increases the engine speed beyond the condition represented by Figure 3, or suddenly tramps on the accelerator to demand sudden power, so that both throttle valves are now opened. Carburetor 14 is now connected to deliver its fuel mixture to the four upper intake manifold passages, so that the engine cylinders now receive fuel mixtures from both carburetors and in sufficient quantity to satisfy power demands. With both throttle valves 94 and 95 open the available manifold passage area becomes doubled, thereby preventing the fuel mixture velocities from becoming too high with increased engine speeds. The total intake passage area available when both valves 94 and 95 are open is about equal to the standard manifold passage area.

Figure 17:
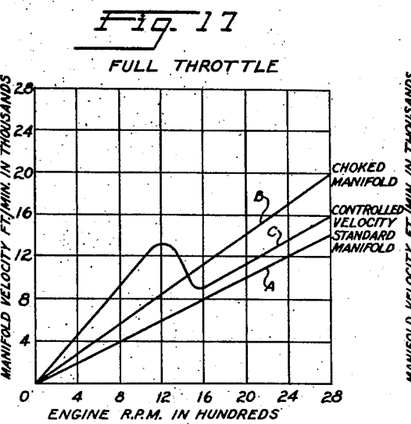
Figures 17-20 comprise curves variously illustrating advantages of the invention over prior intake manifold arrangements.

Curves A, B and C in Figure 17 represent theoretical relative fuel mixture velocities in three different types of intake manifolds. Curve A represents fuel mixture velocities calculated for a usual single passage standard intake manifold for a 162 cubic inch four cylinder gasoline engine. Curve B represents fuel mixture velocities calculated for a known intake manifold of the choked single passage type on the same engine. Curve C represents fuel mixture velocities calculated for a controlled velocity manifold of the invention on the same engine. All curves are based on wide open throttle conditions, and the calculations are made over a normal range of engine speeds encountered in delivery vehicle practice.

These curves were calculated as follows. The conventional four stroke cycle four cylinder 162 cubic inch engine used for the example has two intake strokes per engine revolution, and displaces $$\frac{162}{4} = 40.5$$

cubic inches of fuel mixture for each intake stroke, assuming the cylinders to be filled at each intake stroke. The four strokes of each cycle for each cylinder are the usual intake, compression, work and exhaust strokes. Hence two engine revolutions are required to complete each engine cycle, and a four cylinder engine has two intake strokes per engine revolution so that $2 \times 40.5 = 81$ cubic inches of fuel mixture are drawn into the engine during each engine revolution. Thus, for an engine speed of 1200 revolutions per minute, the engine will draw in $81 \times 1200 = 97,200$ cubic inches of fuel mixture; and, if the manifold cross-section is 2 square inches, the fuel mixture velocity would be $$\frac{97,200}{2} = 48,600$$

inches per minute.

The standard and choked intake manifolds remain of constant passage cross-section, so that their calculated fuel mixture velocity curves are straight lines as at A and B. My controlled velocity manifold substantially doubles in cross sectional passage area at a predetermined speed, in Figure 7 at 1200 R. P. M. This increase in manifold area interrupts the sharply rising fuel mixture velocity before it becomes too high and introduces a drop in the fuel mixture velocity at intermediate speeds. At higher engine speeds, this drop in fuel mixture velocity is arrested and, as at 1600 R. P. M. in Figure 7, the fuel mixture velocity again increases with increasing engine speeds. Since the total intake manifold area in the controlled velocity manifold used for curve C was slightly less than the area of the standard intake manifold used for curve A, the fuel mixture velocities at higher engine speeds are slightly higher than standard but are not as excessively high as in a choked intake manifold like that used for curve B. Thus, at higher engine speeds, my controlled velocity intake manifold has all the advantages of the standard manifold and none of the power sacrificing disadvantages of the choked intake manifold.

The advantages of my controlled velocity intake manifold are especially evident, however, at low engine speeds where, with an intake passage area about one-half of the normal standard intake manifold passage area, the fuel mixture velocities rise sharply and are far higher than obtainable in either the practical choked or standard intake manifolds. My two stage construction enables me to use a lower intake manifold section having a passage area appreciably less than would be possible as a practical matter in prior choked manifold assemblies, so that my invention is at least equivalent to and generally more economical than the prior choked manifold at low engine speeds.

The characteristics of my controlled velocity intake manifold relative to standard and choked intake manifolds may be suitably varied by selection of proper passage areas and properly selected staged operation of the two manifold sections.

It will be appreciated that the curves of Figure 17 discount friction and other unavoidable mixture velocity reducing conditions encountered in intake manifolds but, taking the latter into account, the same relative conditions prevail so that the curves are truly representative and give a fair comparison of performance encountered in practice.

Figure 18:
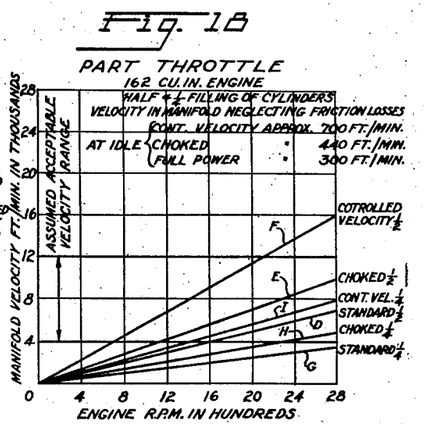

Figure 18 includes a series of curves similarly representing theoretical relative fuel mixture velocities in standard, choked and controlled velocity intake manifolds based on partly open throttle conditions, as distinguished from the fully open throttle condition of Figure 17.

A partly open throttle valve restricts flow of the fuel mixture so that the manifold and engine intake valve passage regions downstream of the throttle valve serve as an expansion chamber wherein the air in the mixture expands and becomes lighter and higher fuel mixture velocities are required to maintain the fuel droplets in suspension.

Curves D, E and F represent relative fuel mixture velocities for about half throttle opening, and curves G, H and I represent relative fuel mixture velocities for about one-quarter throttle opening, calculated for the same standard, choked and controlled velocity intake manifolds respectively as in Figure 17. It is clear that the controlled velocity manifold of the invention gives higher fuel mixture velocities, most of which lie within a designated acceptable velocity range necessary for efficient operation of the engine as indicated in Figure 18.

I have similarly calculated that the same standard, choked and controlled velocity intake manifolds have fuel mixture velocities in the relation of 300, 440 and 700 feet per minute at normal idling speeds.

The part throttle curves of Figure 18 of course represent fuel mixture velocities in the passages in one of the sections of manifold 13.

Figure 19:
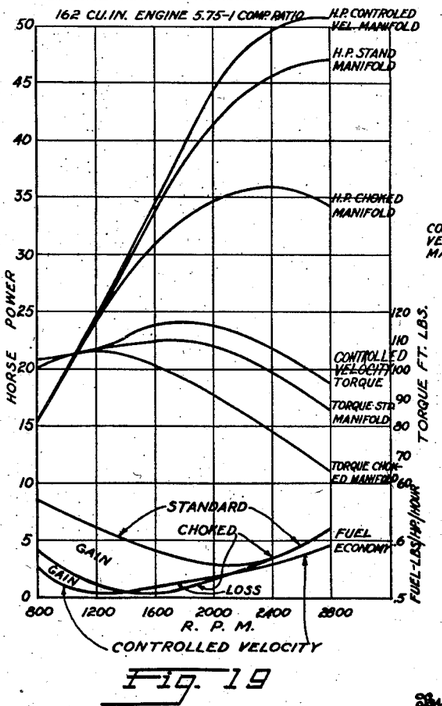

Figure 19 includes relative performance curves based on actual test data on the above 162 cubic inch engine showing further the advantages of the controlled velocity intake manifold of the invention over standard and choked intake manifolds. The standard, choked and controlled velocity manifolds used in the tests were the same as used for the calculations of Figures 17 and 18. The controlled velocity manifold provides much greater horse-power and torque at the higher engine speeds. Also, there is marked fuel economy at low engine speeds and an appreciable gain in fuel economy at higher engine speeds. The possible slight loss in fuel economy as compared to the choked manifold at intermediate speeds is more than offset by the gains at other speeds.

The controlled velocity manifold is more economical than the standard intake manifold under all engine speeds.

Figure 20:
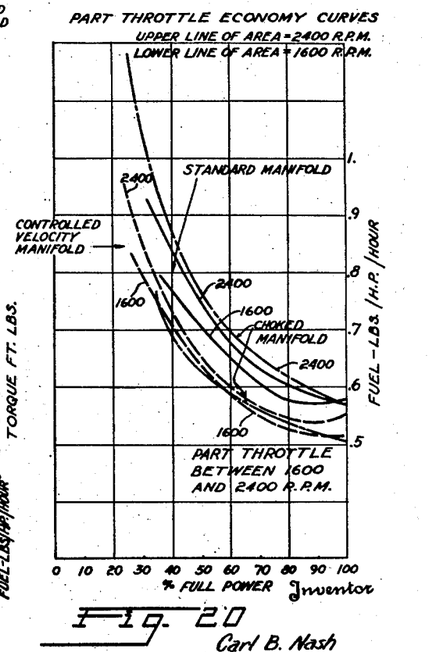

Figure 20 includes relative fuel consumption curves made from test data taken on the above 162 cubic inch engine, operated under partly open throttle conditions. Curves based on engine speeds of 1600 R. P. M. and 2400 R. P. M. are illustrated for the same standard, choked and controlled velocity manifolds as in Figures 17–19. The controlled velocity intake manifold is clearly more economical at both engine speeds and for all power demands.

These curves were made from measured test data showing gasoline required in pounds per horse-power per hour, taken at several different engine R. P. M. and for horse-powers ranging up to maximum. From this measured data, the above curves were computed for comparison of economy at the two selected comparison engine speeds.

The full line curves represent performance of the standard manifold on the engine. The dot-dash line curves represent performance of the choked manifold on the engine. The dash lines represent performance of my controlled velocity manifold of the invention on the engine. These curves further illustrate the improved efficiency and economy obtained by the invention.

The controlled velocity intake manifold of the invention is at least as economical as the choked manifold at low engine speeds and is at least as economical as the standard manifold at high engine speeds, so that the invention obtains the desirable functions of these individually unsatisfactory prior manifold arrangements without the disadvantages of either. The fuel mixture velocities in the manifold are always maintained high enough to keep the fuel droplets in suspension and excessively high fuel mixture velocities are prevented at higher engine speeds. During the entire engine speed range, maximum power is available. Tests on the four cylinder 162 cubic inch engine show that a maximum of about 36 horse-power was obtainable using the choked manifold for economy, whereas the controlled velocity manifold of the invention affords the same low engine speed economy and over 50 horse-power.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein:

What is claimed and desired to be secured by United States Letters Patent is:

1. In an intake manifold assembly, a housing having two spaced fuel mixture inlet openings adapted to be connected to fuel mixture supply means and a plurality of fuel mixture outlet openings adapted to be connected to the intake ports of an internal combustion engine, a partition dividing said housing into two independent fuel mixture passage sections each communicating with one of said inlet openings and with all of said outlet openings, and means in said housing further dividing each of said sections into a plurality of independent fuel mixture passages between said inlet and outlet openings.

2. In the intake manifold assembly defined in claim 1, each of said plurality of mixture passages being of substantially uniform cross-section along its length.

3. In the intake manifold assembly defined in claim 1, each of said manifold sections having equal total passage areas.

4. In an intake manifold assembly, a pair of similar separable housing members, a separable division member, and means securing said housing members on opposite sides of said division member so as to provide two independent fuel mixture passage sections within said housing.

5. In the intake manifold assembly defined in claim 4, an external heat transfer projection on said division member.

6. In an internal combustion engine assembly, an engine having a plurality of intake valve ports leading to valve seats, an intake manifold having two inlet openings and a plurality of outlet openings adapted to be connected to said ports, means within said manifold separating it into two passage sections each communicating with an inlet opening and all of said outlet openings, means within each manifold section separating it into individual passages between said inlet and outlet openings, and partition means in said valve ports providing substantial continuations of said passages substantially to said valve seats.

7. The engine assembly defined in claim 6, wherein said partition means comprises means on said manifold projecting into said ports.

8. The engine assembly defined in claim 6, wherein said partition means are built into said inlet ports.

9. An intake manifold assembly having outlet openings adapted to be connected to the intake valve ports of an internal combustion engine, means providing a plurality of separate fuel mixture passages within said manifold leading to said openings, and means projecting from said manifold adjacent said openings adapted for insertion into said valve ports for providing substantial continuation of said passages into said engine.

10. In an intake manifold, an elongated substantially arcuate housing member having open ends and an open side, means providing a fuel mixture intake conduit in the otherwise closed side of said housing opposite said open side, and internal ribs in said housing member upstanding from said closed side of said housing member extending from adjacent opposite edges of the inner mouth of said conduit to the opposite open ends of said housing member, said ribs providing a plurality of individual fuel mixture passages between said conduit and the ends of said housing member.

11. A division plate for an intake manifold comprising a substantially arcuate flat plate, and an integral heat transfer flange projecting from the concave side thereof.

12. A division plate for an intake manifold comprising a substantially arcuate flat plate, and an integral heat transfer flange projecting from the concave side thereof, said flange having a bent neck portion and a flat section disposed in a plane substantially parallel to but displaced from the plane of said plate.

13. In the intake manifold assembly defined in claim 1, each of said plurality of mixture passages of one of said sections having a complementary adjacent passage in the other section leading to a common one of said outlet openings.

14. In a manifold assembly for an internal combustion engine, associated exhaust and intake manifolds secured to said engine in operative alignment with the engine valve ports; individual carburetor means connected to said intake manifold; and plate means having a portion exposed to the gases in said exhaust manifold, a portion within said intake manifold exposed to the incoming fuel from said carburetors and a reduced neck portion interconnecting said exposed portions for providing a predetermined desired degree of heat transfer from said exhaust manifold to the incoming fuel from said carburetors.

CARL B. NASH.

REFERENCES CITED

The following references are of record in the file of this patent:

UNITED STATES PATENTS

| Number | Name | Date |
| --- | --- | --- |
| 1,112,257 | Brush | Sept. 29, 1914 |
| 1,368,178 | Maire | Feb. 8, 1921 |
| 1,506,548 | Pingree | Aug. 26, 1924 |
| 2,051,351 | Speed | Aug. 18, 1936 |
| 2,075,330 | Angell, Jr., et al. | Mar. 30, 1937 |
| 2,314,926 | Egli | Mar. 30, 1943 |
| 2,317,625 | Mallory | Apr. 27, 1943 |